US007843613B2

(12) United States Patent
Wang et al.

(10) Patent No.: US 7,843,613 B2
(45) Date of Patent: Nov. 30, 2010

(54) SYSTEM AND METHOD FOR AUTOMATED PROCESSING OF CONSECUTIVELY SCANNED DOCUMENT PROCESSING JOBS

(75) Inventors: Jianxin Wang, Trabuco Canyon, CA (US); Hongfeng Wei, Anaheim, CA (US); William Su, Riverside, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1037 days.

(21) Appl. No.: 11/452,804

(22) Filed: Jun. 14, 2006

(65) Prior Publication Data
US 2007/0291318 A1    Dec. 20, 2007

(51) Int. Cl.
H04N 1/04 (2006.01)
G06K 9/00 (2006.01)
G06K 9/20 (2006.01)

(52) U.S. Cl. .................. 358/486; 382/103; 382/317
(58) Field of Classification Search .......... 358/448, 358/443, 468; 382/100, 103, 317; 700/219, 700/226, 225, 220, 221, 223, 224
See application file for complete search history.

(56) References Cited
U.S. PATENT DOCUMENTS

| 4,352,012 | A | * | 9/1982 | Verderber et al. ........... 235/487 |
|---|---|---|---|---|
| 4,970,554 | A | * | 11/1990 | Rourke .................. 399/84 |
| 5,051,779 | A | * | 9/1991 | Hikawa ................. 399/84 |
| 5,138,465 | A | * | 8/1992 | Ng et al. ............... 358/453 |
| 5,243,381 | A | * | 9/1993 | Hube .................... 399/84 |
| 5,247,371 | A | * | 9/1993 | Hikawa et al. .......... 358/448 |
| 5,729,350 | A | * | 3/1998 | Ozaki .................. 358/296 |
| 5,822,083 | A | * | 10/1998 | Ito et al. .............. 358/403 |
| 5,898,153 | A | * | 4/1999 | Lagan et al. ........... 235/375 |
| 5,980,676 | A | * | 11/1999 | Meetze ................. 156/216 |
| 6,072,917 | A | * | 6/2000 | Mori et al. ............ 382/317 |
| 6,948,654 | B2 | * | 9/2005 | Shioda et al. .......... 235/375 |
| 7,451,014 | B2 | * | 11/2008 | Welch et al. ........... 700/220 |
| 2007/0177764 | A1 | * | 8/2007 | Harman et al. ......... 382/103 |
| 2007/0180049 | A1 | * | 8/2007 | Chtcherbatchenko et al. .... 709/217 |
| 2009/0070702 | A9 | * | 3/2009 | Malik .................. 715/780 |

* cited by examiner

Primary Examiner—Jerome Grant, II
(74) Attorney, Agent, or Firm—SoCal IP Law Group LLP; Steven C. Sereboff; Jonathan Pearce

(57) ABSTRACT

The subject application is directed to a system and method for the automated configuration for document input devices. A document processing device first receives a document, which is scanned to detect an indicia on one of the sheets of the document. The indicia, in the form of a barcode or watermark, are then decoded to generate job data representing a desired device configuration for processing the received document. The job data is then used to program a job processor and the document processing device outputs the document in accordance with the job data.

20 Claims, 5 Drawing Sheets

SYSTEM AND METHOD FOR AUTOMATED PROCESSING OF CONSECUTIVELY SCANNED DOCUMENT PROCESSING JOBS

BACKGROUND OF THE INVENTION

The subject application is directed to a system and method for continuous processing of multiple document processing jobs. In particular, the subject application is directed to a system and method for the automatic configuration of a document processing device in order to continuously process multiple document processing jobs.

Typically, a document processing device is only able to process a single job at time. The exception is if multiple jobs to be processed have the same configuration or parameters, such as the same number of copies, collation requirements, or finishing requirements. This is an issue if a user needs to process multiple document processing jobs having different configurations, such as differing duplex printing options or differing finishing operations. As such, the user must set up the parameters or configuration for the first document processing job, and then wait for that job to finish before configuring the device for the next document processing job. This process must be completed for each separate document processing job. Therefore, the user must spend time waiting for the completion of all the user's jobs rather than working on other tasks. It would be desirable to have a system and method which allows a user to automatically configure a document processing device in order to continuously process multiple document processing jobs without further intervention by the user.

The subject application overcomes the above noted problems and provides a system and method for the continuous processing of multiple document processing jobs.

SUMMARY OF THE INVENTION

In accordance with the subject application, there is provided a system and method for the continuous processing of multiple document processing jobs.

Further, in accordance with the subject application, there is provided a system and method for the automatic configuration of a document processing device in order to continuously process multiple document processing jobs.

Still further, in accordance with the subject application, there is provided an automated configuration system for document input devices. The system includes a programmable document processor and a document input adapted for receiving at least one document, the document comprised of a plurality of sheets. The system also comprises scanner means adapted for scanning sheets of the document, the scanner means including means adapted for generating job data corresponding to an indicia on at least one surface of the document. The system further comprises means adapted for programming the document processor in accordance with generated job data and means adapted for processing at least a portion of the document in accordance with generated job data corresponding thereto.

In one embodiment, the indicia is comprised of visually encoded data, and wherein the system further comprises decoding means adapted for decoding the encoded data after scanning thereof by the scanner means so as to generate the job data. Preferably, the visually encoded data is encoded in at least one of linear encoding, two dimensional encoding, and glyph encoding.

In another embodiment, the indicia are disposed on a surface of a first sheet of the document received into the document input so as to process subsequent sheets in accordance with the job data. Preferably, the system further comprises a document feeder adapted for sequentially feeding a series of documents to the document input, each document having an indicia disposed on a surface of the first sheet received thereby.

In a further embodiment, the indicia is comprised of character data, and wherein the system further comprises optical character reader means adapted for generating the job data from scanned character data.

In a still further embodiment, the indicia is comprised of visual markings selectively added by an associated user in at least one preselected area on the surface, each preselected area corresponding to at least one configuration of the document processor.

Still further, in accordance with the subject application, there is provided a method for the automatic configuration for document input devices in accordance with the system described above.

Still other advantages, aspects and features of the subject application will become readily apparent to those skilled in the art from the following description wherein there is shown and described a preferred embodiment of the subject application, simply by way of illustration of one of the best modes best suited for to carry out the subject application. As it will be realized, the subject application is capable of other different embodiments and its several details are capable of modifications in various obvious aspects all without departing from the scope of the subject application. Accordingly, the drawing and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for the continuous processing of multiple document processing jobs. In particular, the subject application is directed to a system and method for the automatic configuration of a document processing device in order to continuously process multiple document processing jobs.

Figure 1:
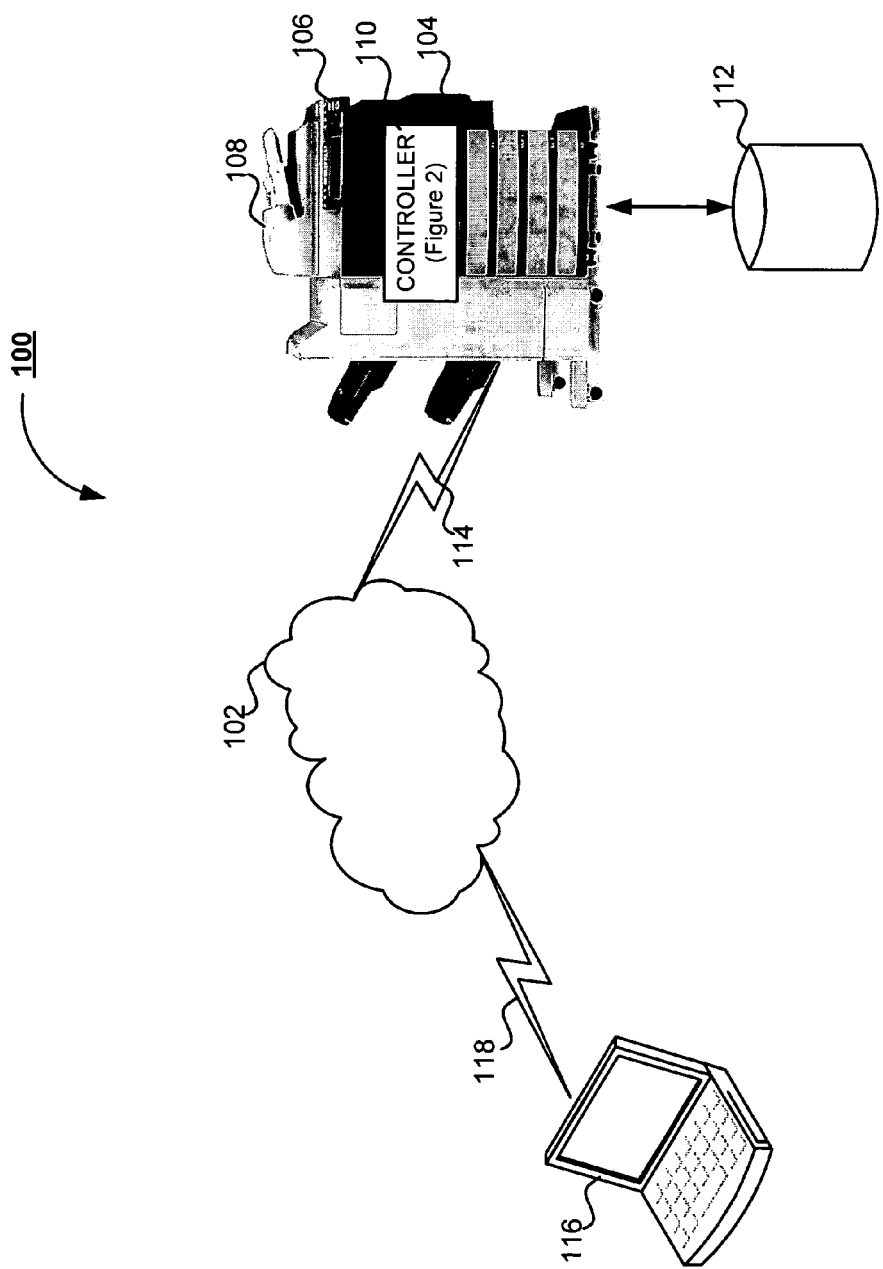
FIG. 1 is an overall diagram of the system for automated configuration of document input devices according to the subject application.

Turning now to FIG. 1, there is shown an overall diagram of the system 100 for continuous processing of multiple document processing jobs in accordance with the subject application. As shown in FIG. 1, the system 100 employs a distributed computing environment, represented as a computer network 102. It will be appreciated by those skilled in the art that the computer network 102 is any distributed communications environment known in the art capable of enabling the exchange of data between two or more electronic devices. Those skilled in the art will further appreciate that the network 102 is any computer network known in the art including, for example and without limitation, a virtual area network, a local area network, a personal area network, the Internet, an intranet, a wide area network, or any suitable combination thereof. Preferably, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms.

The system 100 depicted in FIG. 1 further includes a document processing device 104, represented as a multifunction peripheral device, suitably adapted to perform a variety of document processing operations. The skilled artisan will understand that such document processing operations include, for example and without limitation, copying, scanning, electronic mail, document management, facsimile, printing, and the like. Suitable commercially available document processing devices include, but are not limited to, the Toshiba e-Studio Series Controller. In one embodiment, the document processing device 104 is suitably equipped to receive a plurality of portable storage media, including without limitation, Firewire drive, USB drive, SD, MMC, XD, Compact Flash, Memory Stick, and the like. In the preferred embodiment of the subject application, the document processing device 104 further includes an associated user-interface 106, such as a touch-screen interface, an alpha-numeric interface, an LCD display, or the like, via which an associated user is able to interact directly with the document processing device 104.

The document processing device 104 further includes an automated document feeder 108, suitably configured to transfer a document to a scanning component of the document processing device 104. The skilled artisan will appreciate that any automated feeding means, known in the art, is capable of being implemented in accordance with the subject application. In accordance with the subject application, the document processing device 104 further incorporates a controller 110, suitably adapted to decode encoded visual indicia, as will be explained in greater detail below. According to one embodiment of the subject application, the controller 110 is suitably adapted to facilitate the operations of the first document processing device 104, as will be understood by those skilled in the art. Preferably, the controller 110 is embodied as hardware, software, or any suitable combination thereof, configured to control the operations of the associated document processing device 104, control the display of images via the user-interface 106, control the implementation of watermarks, direct the generation of indicia containing separator pages, and the like. While depicted in FIG. 1 as being integral to the document processing device 104, the skilled artisan will appreciate that the controller 110 is capable of being implemented as an external component to the device 104, without departing from the scope of the subject application. In accordance with one aspect of the subject application, the controller 110 is representative of a document processor, suitably adapted to facilitate the data manipulations of the document processing operations performed by the document processing device 104. The functioning of the controller 110 will better be understood in conjunction with the block diagrams illustrated in FIGS. 2 and 3, explained in greater detail below.

Communicatively coupled to the document processing device 104 is a data storage device 112. In accordance with the preferred embodiment of the subject application, the data storage device 112 is any mass storage device known in the art including, for example and without limitation, magnetic storage drives, a hard disk drive, optical storage devices, flash memory devices, or any suitable combination thereof. In the preferred embodiment, the data storage device 112 is suitably adapted to store information relative to the configuration or device settings of the document processing device 104. Preferably, the data storage device 112 further includes data representative of a variety of barcodes, watermarks, or the like, which are used to establish device configurations. The functionality of such data will be explained in greater detail below. It will be appreciated by those skilled in the art that while illustrated in FIG. 1 as being a separate component of the system 100, the data storage device 112 is capable of being implemented as internal storage of the document processing device 104, such as, for example and without limitation, an internal hard disk drive, or the like.

Preferably, the document processing device 104 is communicatively coupled to the computer network via a suitable communications link 114. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

The system 100 further includes at least one user device 116, communicatively coupled to the computer network 102 via a communications link 118. It will be appreciated by those skilled in the art that the user device 116 is depicted in FIG. 1 as a laptop computer for illustration purposes only. As the skilled artisan will understand, the user device 116 shown in FIG. 1 is representative of any personal computing device known in the art, including, for example and without limitation, a computer workstation, a personal computer, a personal data assistant, a web-enabled cellular telephone, a smart phone, or other web-enabled electronic device. The communications link 118 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 116 is suitably adapted to generate and transmit electronic documents, as well as document processing instructions, to the document processing device 104, or any other similar device coupled to the computer network 102.

Figure 2:
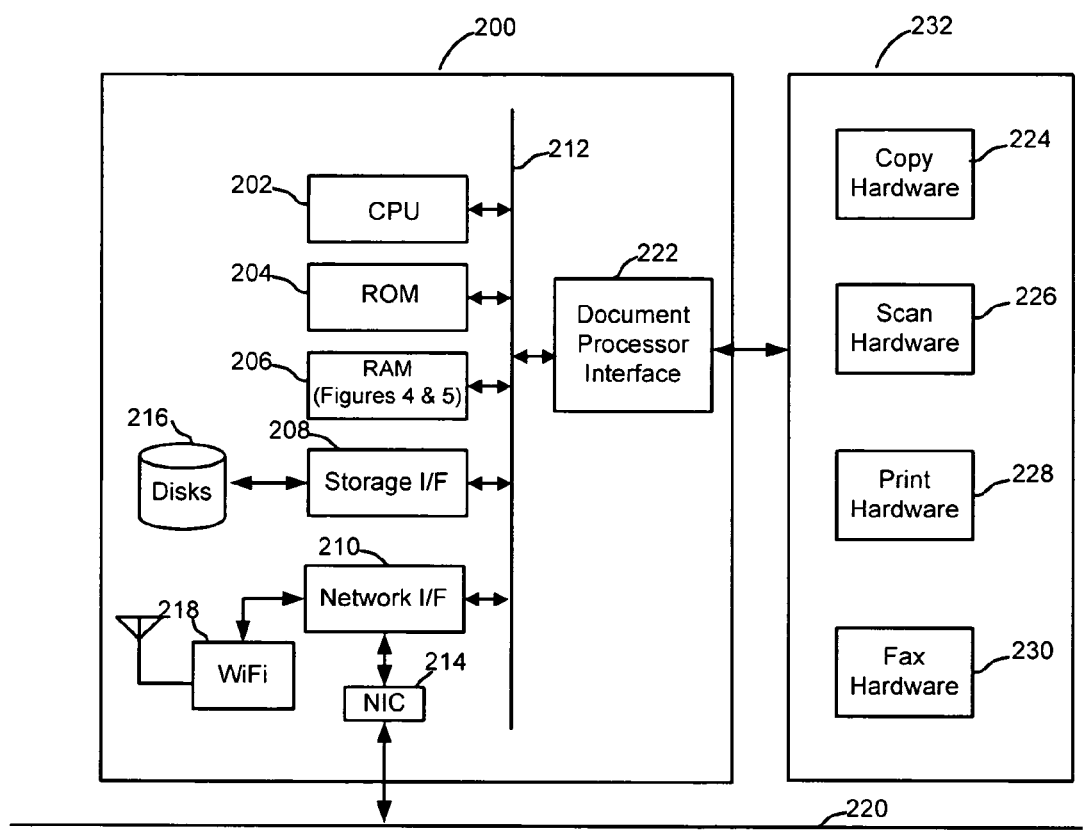
FIG. 2 is a block diagram illustrating controller hardware for use in the system for automated configuration of document input devices according to the subject application.

Turning now to FIG. 2, illustrated is a representative architecture of a suitable controller 200, shown in FIG. 1 as the controller 110, on which operations of the subject system 100 are completed. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
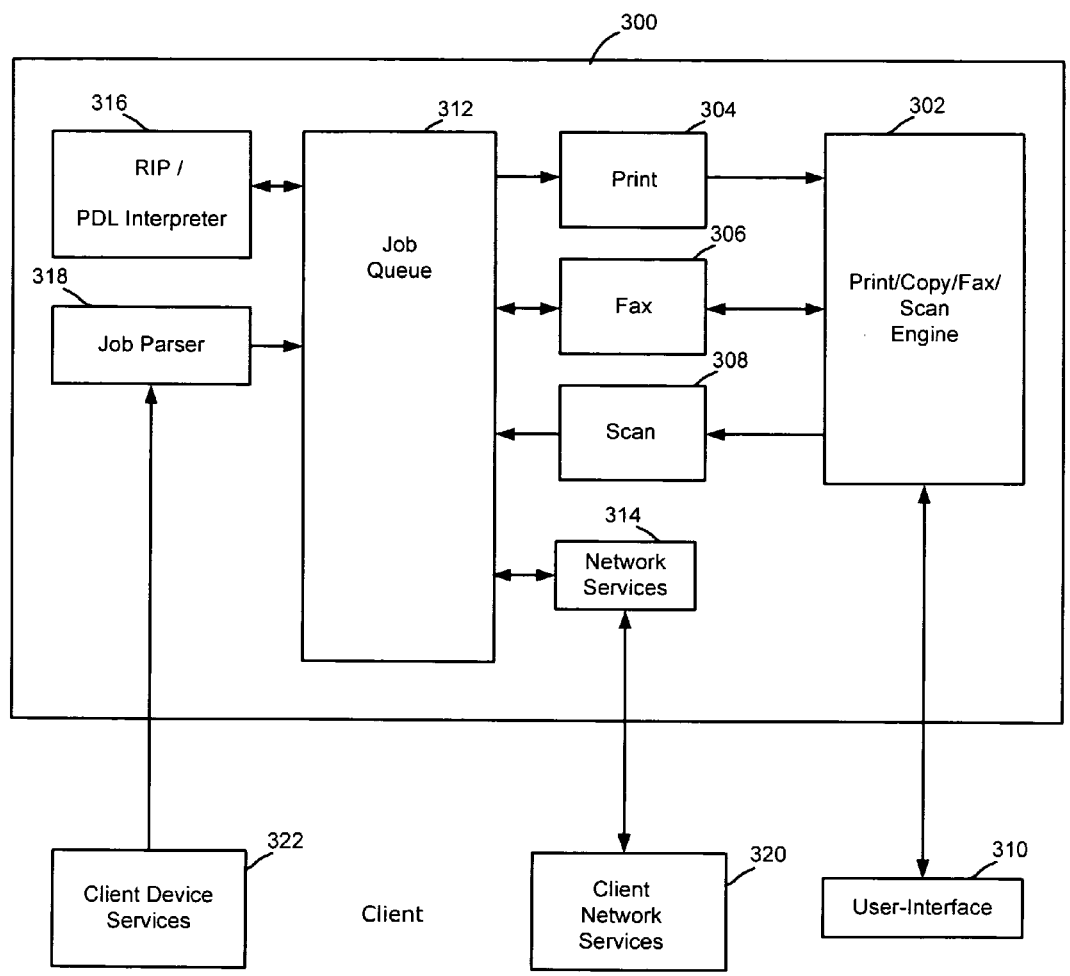
FIG. 3 is a functional block diagram illustrating a controller for use in the system for automated configuration of document input devices according to the subject application.

Functionality of the subject system is accomplished on a suitable document processing device that includes the controller 200 of FIG. 2 as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, the controller 110 associated with the document processing device 104 receives configuration settings, or data, from an associated user via any suitable means known in the art. For example, the associated user is capable of selecting device settings using the user device 116 via the computer network 102, or via the user-interface 106 directly at the document processing device 104. When selected via the user device 116, the skilled artisan will appreciate that a suitable device driver is capable of being employed to facilitate the configuration settings. When accomplished via the user-interface 106, the skilled artisan will understand that a software utility, using a processor associated with the controller 110, is employed to facilitate the selection of the desired configuration settings. Preferably, the configuration settings selected by the user for an original document are thereafter used for each reproduction of the document.

Irrespective of the manner in which the settings are selected by the associated user, indicia representing the selected configuration are generated by the controller 110. Preferably, these indicia are used to designate the settings for a given original document to be processed by the document processing device 104. It will be appreciated by those skilled in the art that the indicia is capable of comprising character data, suitably interpreted via optical character recognition by a document processing device. The controller 110 then selectively adds the indicia to an original document. The addition of the indicia will vary, depending upon the type of indicia designated by the user. Thus, when the user has selected the use of a watermark, the first page of the original document is output with the watermark affixed thereto. As the skilled artisan will appreciate, the watermark is capable of being visible to the user and the controller 110 associated with the document processing device 104, or hidden whereby it is only visible to the controller 110. When the indicia is selectively added as, for example a barcode, a separator page is generated containing the indicia. In accordance with one embodiment of the subject application, the separator page is stored in the data storage device 112 by the controller 110 associated with the document processing device 104 for future use with other documents using the same device configuration settings. In accordance with one aspect of the subject application, the indicia is selectively added by the user in a preselected area of the page, e.g., the first page or the separator page, such that each preselected area of the page corresponds to a different configuration of the document processing device 104. The original document is then output with the indicia printed on the separator page. Preferably, the separator page is output as the first page of the original document, with the remainder of the original document printed out thereafter.

When the separator page is used, the indicia is preferably implemented as a barcode. As will be appreciated by those skilled in the art, the barcode is any encoding indicia, including, for example and without limitation, EAN-13, EAN-8, EAN-Bookland, UPC-A, UPC-E, UPC Shipping, ITF-14, SCC-14, Code 11, Interleaved 2 of 5, Industrial 2 of 5, Standard 2 of 5, Codabar (USD-4, NW-7, 2 of 7), Plessey, MSI, OPC, Postnet, Code 39, Code 93, Extended Cod 93, Code 128, UCC/EAN-128, LOGMARS, PDF-417, DataMatrix, Maxicode, QR Code, or the like. The skilled artisan will appreciate that the barcode is machine readable, designating a configuration setting for the document processing device 104. Thus, as will be apparent to those skilled in the art, the indicia is capable of comprising character data, suitably detected and interpreted by the recipient document processing device via optical character recognition means. Similarly, the watermark is encoded containing machine readable instructions for the desired configuration of the document processing device 104 corresponding to the output of the original document to which it is affixed. The skilled artisan will appreciate that the visually encoded data, either barcode or watermark, is capable of being implemented as linear encoding, two-dimensional encoding, glyph encoding, or other encoding methods known in the art.

In accordance with one embodiment of the subject application, the document processing device 104 includes a software utility, suitably adapted to facilitate the generation of the separator page. Preferably, the separator page contains a barcode image that encodes the desired copy configuration. According to one embodiment of the subject application, the software utility suitably resides and operates via the controller 110, as will be understood by those skilled in the art. The software utility further enables the user, via a graphical user-interface, displayed via the user-interface 106, to generate the separator page, store a separator page to the data storage device 112, print out the separator page, and the like. It will be understood by those skilled in the art that the user is thereafter able to incorporate a stored separator page into subsequent document processing jobs, allowing the subject application to be implemented by such subsequent jobs.

In accordance with another aspect of the subject application, the controller 110 associated with the document processing device 104 includes a software utility suitably adapted to facilitate the inclusion of a watermark that encodes the copy configuration for a given document. Preferably, the user specifies a desired document processing configuration via a graphical user-interface displayed on the associated user-interface 106, which is then encoded to form the watermark. The watermark is thereafter imprinted on the first page of the document to be used as originals for document processing jobs that will thereafter use the automated configuration operation in accordance with the subject application.

Having briefly described the manner in which the indicia is interfaced with an original document output by the document processing device 104, attention now turns to the reproduction of an original document by the document processing device 104 using the configuration settings contained in the encoded indicia. The document processing device 104 first receives the original document via any suitable means. Preferably, the original document, with the separator page as the first page of the document, or the page containing the affixed watermark as the first page, is placed in the automatic document feeder 108. A determination is then made by the controller 110 associated with the document processing device 104 whether or not automatic configuration is enabled. That is, a determination is made by the controller 110 whether the document processing device 104 is to be automatically configured based upon encoded indicia associated with the document being reproduced. When automatic configuration is not enabled, the controller 110 associated with the document processing device 104 uses the current device 104 settings and performs the requested document processing operation.

When the document processing device 104 is configured to accept automatic configuration based upon document indicia, the original document is scanned by the document processing device 104 via any suitable means known in the art. A determination is then made whether encoded indicia is detected, i.e., whether a barcode on a separator page or a watermark on the first page of the document is found. When no such indicia are located, the document processing operation is aborted and the user is notified of the failure. When such indicia is identified by the controller 110 associated with the document processing device 104, the encoded indicia is decoded to generate job data, inclusive of the configuration settings of the document processing device 104 with respect to the output of the document. Preferably, the barcode or watermark is identified by the controller 110, decoded, and the configuration settings designated by the decoded code are implemented by programming the controller 110 associated with the document processing device 104 with the settings, described in greater detail below with respect to FIGS. 2 and 3. In accordance with one embodiment of the subject application, the controller 110 determines, based upon the location of the indicia, the configuration settings to be used in processing the received document. Furthermore, the subject application is capable of implementing character data as the visible indicia, which data is then interpreted via optical character recognition by the controller 110 associated with the document processing device 104. The document processing request is then output in accordance with the configuration settings. It will be appreciated by those skilled in the art that each subsequent job is scanned to determine if new configuration settings are to be implemented.

In accordance with one aspect of the subject application, the controller 110 associated with the document processing device 104 includes a software utility suitably adapted to control the workflow for a document processing job using the automated configuration methodology. Preferably, an associated user is capable of enabling or disabling the automated configuration ability via a graphical user-interface displayed to the user via the associated user-interface 106. In such an embodiment, the software utility is tasked with the decoding of the barcode on the separator page and the decoding of the watermark on the first page of each original document. Thereafter, the document processing device 104, as directed by the controller 110, scans each page of an original document to detect an encoded barcode or watermark. The software utility then reads the configuration data contained in the barcode or watermark and adjusts the document processing device settings accordingly. The configuration of the document processing device 104 is then used for the current job until a new separator page or watermark is detected.

Figure 4:
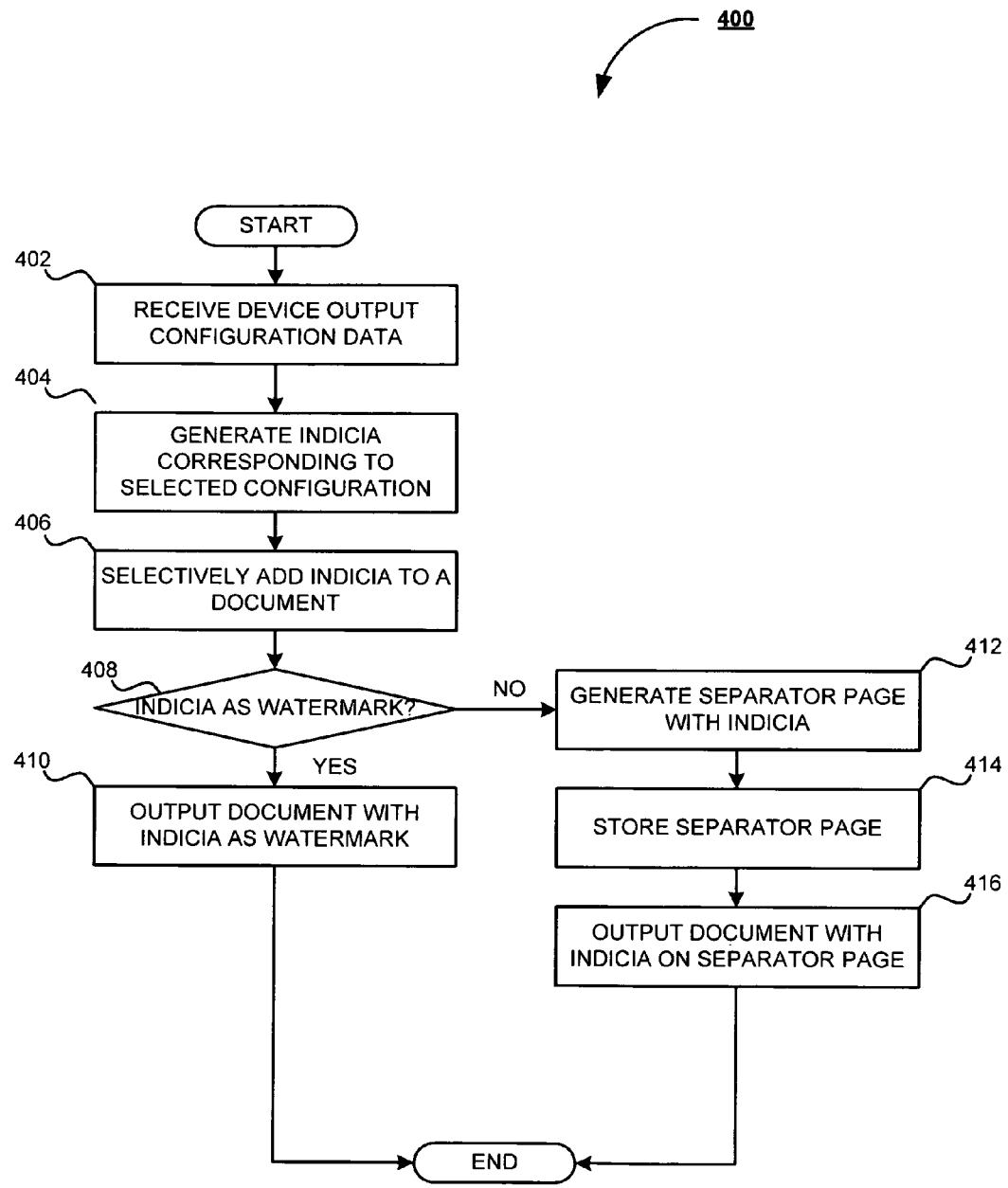
FIG. 4 is a flowchart illustrating a method for automated configuration of document input devices from the generation of indicia according to the subject application.
Figure 5:
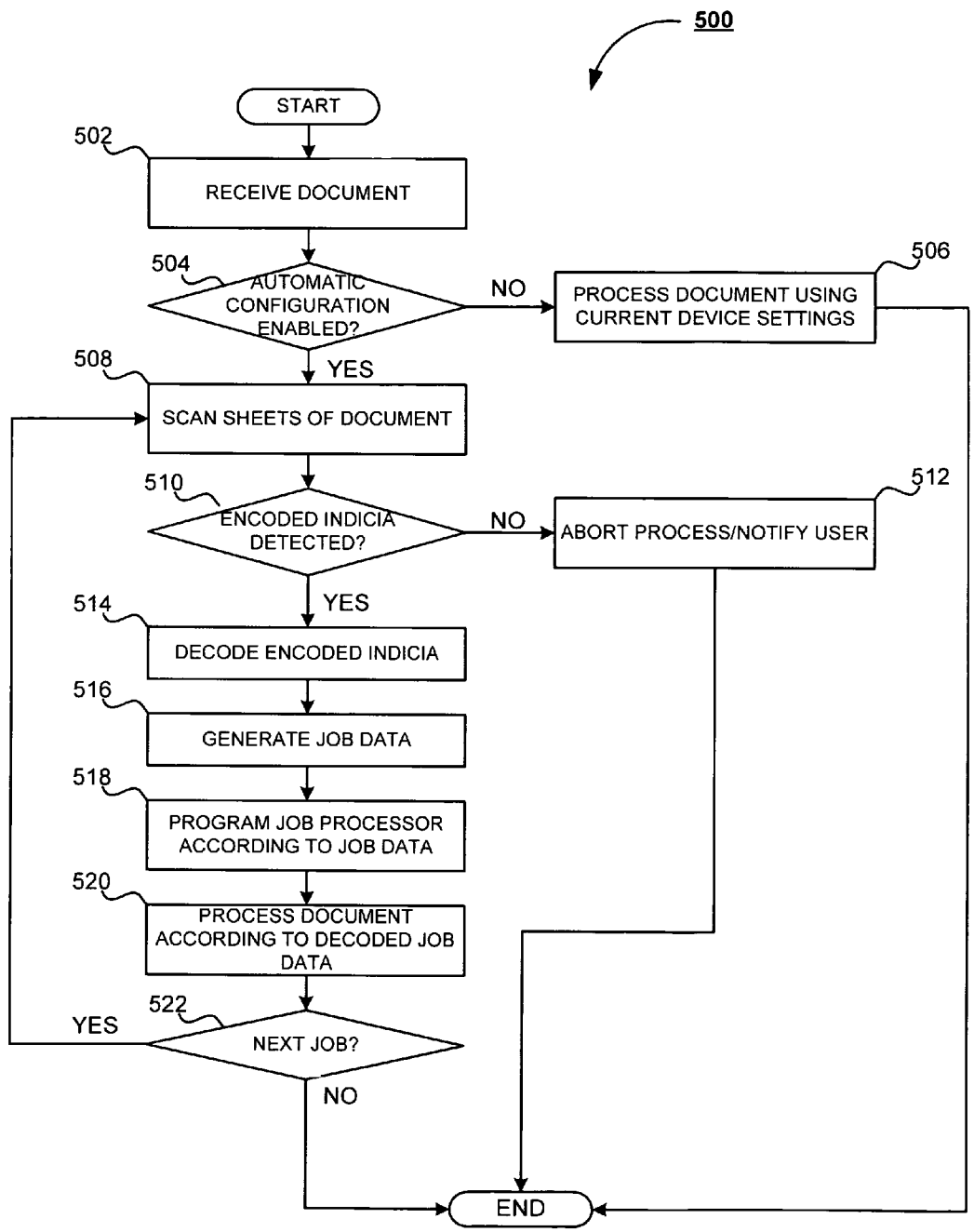
FIG. 5 is a flowchart illustrating a method for automated configuration of document input devices using indicia on a document according to the subject application.

The foregoing system 100 and corresponding components described above in FIGS. 1, 2, and 3 will better be understood when viewed in conjunction with the methodologies set forth in FIG. 4 and FIG. 5. Referring now to FIG. 4, there is shown a flowchart 400 illustrating a method for automated configuration of document input devices from the generation of indicia in accordance with the subject application. Beginning at step 402, the controller 110 associated with the document processing device 104 receives configuration data from an associated user. As stated above, the configuration data is capable of being transmitted from a device driver on the user device 116 via the computer network 102, or via the associated user-interface 106 at the document processing device 104. The controller 110 then encodes the configuration data by generating, at step 404, indicia representative of the configuration data. The skilled artisan will appreciate that the controller 110 associated with the document processing device 104 uses a barcode or watermark indicia to represent the desired configuration data for the output of a given document, e.g., an original document.

At step 406, the controller 110 associated with the document processing device 104 selectively adds the indicia to an original document via any suitable means. Preferably, the indicia is added to an electronic copy of the original document, which is then able to be output by the document processing device 104. At step 408, a determination is made whether the indicia is to be in watermark form. When the configuration data, as encoded in the indicia, is to be affixed to a document in a watermark format, flow proceeds to step 410, whereupon the document processing device 104, as directed by the controller 110, outputs the original document with the watermark indicia on the first page of such document. The skilled artisan will appreciate that the watermark need not be visible to the user, however the watermark must be in machine readable format. In accordance with one embodiment of the subject application, the placement of the indicia on the first page or the separator page of the document is capable of indicating the desired configuration settings for use by a document processing device in processing the document. Those skilled in the art will appreciate that the indicia added to the document is further capable of implementation as character data, suitably capable of being interpreted via an optical character recognition process by the recipient document processing device. As a result of step 410, an original hardcopy document is output by the document processing device 104 with the watermark affixed to the first page of the document.

When it is determined at step 408 that the indicia selectively added to the electronic document is not to be affixed as a watermark, flow proceeds to step 412, whereupon the document processing device 104, at the direction of the controller 110, generates a separator page inclusive of the indicia. Preferably, the indicia affixed to the separator page are comprised of a machine readable barcode, as will be understood by those skilled in the art. Suitable barcodes capable of being implemented in accordance with the subject application include, for example and without limitation, EAN-13, EAN-8, EAN-Bookland, UPC-A, UPC-E, UPC Shipping, ITF-14, SCC-14, Code 11, Interleaved 2 of 5, Industrial 2 of 5, Standard 2 of 5, Codabar (USD-4, NW-7, 2 of 7), Plessey, MSI, OPC, Postnet, Code 39, Code 93, Extended Cod 93, Code 128, UCC/EAN-128, LOGMARS, PDF-417, DataMatrix, Maxicode, QR Code, or the like.

In accordance with one aspect of the subject application, the separator page generated by the document processing device 104 is stored in the data storage device 112 at step 414. It will be appreciated by those skilled in the art that such storage enables the controller 110 associated with the document processing device 104 to retrieve and reuse the separator page for subsequent documents having the same desired device configuration data. Flow then proceeds from step 414 to step 416, whereupon the document processing device 104 outputs a hardcopy original of the document with the first page of the output document comprising the separator page having the barcode indicia affixed thereto.

With respect to FIG. 5, there is shown a flowchart 500 illustrating a method for automated configuration of document input devices using indicia on a document in accordance with the subject application. The methodology of FIG. 5 begins at step 502, whereupon the document processing device 104 receives a hardcopy original of the document. It will be understood by those skilled in the art that the use of a hardcopy is for example purposes only, and the subject application is capable of receiving the original document in an electronic format. Preferably, the original document is inserted into the automatic document feeder 108, as is customary with document processing devices known in the art. It will be appreciated by those skilled in the art that a series of documents are capable of being placed on the automatic document feeder 108, without departing from the scope of the subject application. A determination is then made at step 504 by the controller 110 whether the document processing device 104 is configured so as to enable automated configuration of device settings. Preferably, a graphical user-interface, displayed on the associated user-interface 106, is used by a user or administrator to enable the automated configuration of the device 104. When the automated configuration capabilities of the document processing device 104 are not enabled, flow proceeds to step 506, whereupon the original document is processed using the current device settings in accordance with the selected document processing operation.

When it is determined at step 504 that the document processing device 104 is capable of automatically configuring its settings, flow proceeds to step 508, whereupon the original document is scanned into an electronic format. It will be understood by those skilled in the art that the original document is fed, one sheet at a time, from the automatic document feeder 108 to a scanning component associated with the document processing device 104, which thereafter results in the generation of electronic data representative of the original document. A determination is then made at step 510 by the controller 110 associated with the document processing device 104 whether the first scanned sheet of the original document contains any encoded indicia, e.g., a watermark or barcode. When no such indicia is identified by the controller 110, flow proceeds to step 512, whereupon the requested document processing operation is aborted and the user is informed of the error.

When encoded indicia is identified by the controller 110 associated with the document processing device 104 at step 510, flow progresses to step 514, whereupon the encoded indicia, e.g., watermark or barcode, is decoded to retrieve configuration settings associated with the processing of the document. It will be appreciated by those skilled in the art that the encoded indicia is capable of comprising character data, identified and interpreted by the controller 110 via an optical character recognition process executed thereon. In accordance with one embodiment of the subject application, the location of the indicia on the page is capable of indicating the configuration settings to be used by the document processing device 104. The decoded indicia is then used, at step 516, to generate job data representative of the configuration settings to be used by the document processing device 104 in the processing of the original document. The controller 110, or job processor, associated with the document processing device 104, is then programmed in accordance with the job data at step 518. The original document is then processed at step 520 using the configuration settings contained in the indicia scanned from the original document. A determination is then made by the controller 110 associated with the document processing device 104 whether any additional jobs remain to be processed at step 522. When additional jobs have been received, flow returns to step 508, whereupon the next document is scanned to ascertain the configuration settings for processing the next job. When no additional jobs remain for processing, the operation terminates.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed is:

1. An automated configuration system for document input devices comprising:
    a programmable document processor;
    means adapted for receiving, from an associated user, document processing instructions associated with a document processing job;
    means adapted for encoding the received document processing instructions;
    means adapted for generating a job configuration sheet including a rendered indicia corresponding to the encoded document processing instructions;
    a document input adapted for receiving at least one document and the job configuration sheet associated therewith, the document comprised of a plurality of content sheets distinct from the job configuration sheet, which job configuration sheet contiguous with the at least one document prior to processing thereof;
    scanner means adapted for scanning sheets of the document including the indicia disposed on the job configuration sheet, the scanner means including means adapted for decoding scanned indicia to generate the job processing instructions corresponding thereto;
    means adapted for programming the document processor in accordance with the job processing instructions; and
    means adapted for processing at least a portion of the document in accordance with the job processing instructions.

2. The automated configuration system for document input devices of claim 1 wherein the indicia is comprised of visually encoded data.

3. The automated configuration system for document input devices of claim 2 wherein the visually encoded data is encoded in at least one of linear encoding, two dimensional encoding, and glyph encoding.

4. The automated configuration system for document input devices of claim 1 wherein the indicia is comprised of character data.

5. The automated configuration system for document input devices of claim 1 wherein the indicia is comprised of visual markings selectively added by an associated user in at least one preselected area of the job configuration sheet, each preselected area corresponding to at least one configuration of the document processor.

6. An automated configuration method for document input devices comprising the steps:
    receiving, from an associated user, document processing instructions associated with a document processing job;
    encoding the received document processing instructions;
    generating a job configuration sheet including a rendered indicia corresponding to the encoded document processing instructions;
    receiving at least one document and the job configuration sheet associated therewith, the document comprised of a plurality of content sheets distinct from the job configuration sheet, which configuration sheet is contiguous with the at least one document prior to processing thereof;
    scanning sheets of the document including the indicia disposed on the job configuration sheet;
    decoding scanned indicia to generate the job processing instructions corresponding thereto;

programming an associated document processor in accordance with the job processing instructions; and processing at least a portion of the document in accordance with the job processing instructions.

7. The automated configuration method for document input devices of claim 6 wherein the indicia is comprised of visually encoded data.

8. The automated configuration method for document input devices of claim 7 wherein the visually encoded data is encoded in at least one of linear encoding, two dimensional encoding, and glyph encoding.

9. The automated configuration method for document input devices of claim 6 wherein the indicia is comprised of character data.

10. The automated configuration method for document input devices of claim 6 wherein the indicia is comprised of visual markings selectively added by an associated user in at least one preselected area of the job configuration sheet, each preselected area corresponding to at least one configuration of the document processor.

11. A computer-implemented method for automated configuration for document input devices comprising the steps:

receiving, from an associated user, document processing instructions associated with a document processing job;

encoding the received document processing instructions;

generating a job configuration sheet including a rendered indicia corresponding to the encoded document processing instructions;

receiving at least one document and the job configuration sheet associated therewith, the document comprised of a plurality of content sheets distinct from the job configuration sheet, which configuration sheet is contiguous with the at least one document prior to processing thereof;

scanning sheets of the document including the indicia disposed on the job configuration sheet;

decoding scanned indicia to generate the job processing instructions corresponding thereto;

programming an associated document processor in accordance with the job processing instructions; and processing at least a portion of the document in accordance with the job processing instructions.

12. The computer-implemented method for automated configuration for document input devices of claim 11 wherein the indicia is comprised of visually encoded data.

13. The computer-implemented method automated configuration for document input devices of claim 12 wherein the visually encoded data is encoded in at least one of linear encoding, two dimensional encoding, and glyph encoding.

14. The computer-implemented method for automated configuration for document input devices of claim 11 wherein the indicia is comprised of character data.

15. The computer-implemented method for automated configuration for document input devices of claim 11 wherein the indicia is comprised of visual markings selectively added by an associated user in at least one preselected area of the job configuration sheet, each preselected area corresponding to at least one configuration of the document processor.

16. A computer-implemented system for automated configuration for document input devices comprising:

an input operable for receiving, from an associated user, document processing instructions associated with a document processing job;

a processor operable for encoding the received document processing instructions;

the processor further operable for generating a job configuration sheet including a rendered indicia corresponding to the encoded document processing instructions;

an input operable for receiving at least one document and the job configuration sheet associated therewith, the document comprised of a plurality of content sheets distinct from the job configuration sheet, which configuration sheet is contiguous with the at least one document prior to processing thereof;

a scanner operable for scanning sheets of the document including the indicia disposed on the job configuration sheet;

the processor further operable for decoding scanned indicia to generate the job processing instructions corresponding thereto;

the processor further operable for programming an associated document processor in accordance with the job processing instructions; and the processor further operable processing at least a portion of the document in accordance with the job processing instructions.

17. The system for automated configuration for document input devices of claim 16 wherein the indicia is comprised of visually encoded data.

18. The system automated configuration for document input devices of claim 17 wherein the visually encoded data is encoded in at least one of linear encoding, two dimensional encoding, and glyph encoding.

19. The system for automated configuration for document input devices of claim 16 wherein the indicia is comprised of character data.

20. The system for automated configuration for document input devices of claim 16 wherein the indicia is comprised of visual markings selectively added by an associated user in at least one preselected area of the job configuration sheet, each preselected area corresponding to at least one configuration of the document processor.

* * * * *